US010761744B2

(12) United States Patent
Ash et al.

(10) Patent No.: US 10,761,744 B2
(45) Date of Patent: Sep. 1, 2020

(54) SYNCHRONOUSLY PERFORMING COMMIT RECORDS OPERATIONS

(71) Applicant: International Business Machines Corporation, Armonk, NY (US)

(72) Inventors: Kevin J. Ash, Tucson, AZ (US); Lokesh M. Gupta, Tucson, AZ (US); Matthew J. Kalos, Tucson, AZ (US); Beth A. Peterson, Tucson, AZ (US); Louis A. Rasor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/696,052

(22) Filed: Sep. 5, 2017

(65) Prior Publication Data

US 2019/0073142 A1 Mar. 7, 2019

(51) Int. Cl.
*G06F 13/28* (2006.01)
*G06F 3/06* (2006.01)
(Continued)

(52) U.S. Cl.
CPC ............ *G06F 3/0619* (2013.01); *G06F 3/065* (2013.01); *G06F 3/0611* (2013.01); *G06F 3/0659* (2013.01); *G06F 3/0679* (2013.01); *G06F 9/546* (2013.01); *G06F 13/28* (2013.01); *G06F 13/4022* (2013.01); *G06F 13/4282* (2013.01); *G06F 2213/0026* (2013.01)

(58) Field of Classification Search
CPC ........ G06F 3/065; G06F 3/0679; G06F 9/546; G06F 13/28

USPC .......................................................... 710/27
See application file for complete search history.

(56) References Cited

U.S. PATENT DOCUMENTS 8,438,332 B2    5/2013  Ash et al.
8,452,929 B2    5/2013  Bennett
(Continued)

FOREIGN PATENT DOCUMENTS

WO        2014208863      12/2014

OTHER PUBLICATIONS

US Patent Application, filed Sep. 5, 2017, for U.S. Appl. No. 15/696,037, invented by Kyler A. Anderson et al., Total 4, pages.
(Continued)

*Primary Examiner* — Chun Kuan Lee
(74) *Attorney, Agent, or Firm* — Janaki K. Davda; Konrad, Raynes, Davda and Victor LLP

(57) ABSTRACT

Provided are techniques for synchronously performing commit records operations. A local copy of a commit records message is built for a Non-Volatile Storage (NVS) track, with a valid indicator set to indicate that this commit records message is valid and has not been processed yet. A Direct Memory Access (DMA) chain is executed to transfer customer data from a host to real segments and alternate segments of a track buffer and to transfer the local copy of the commit records message to a mail message structure of a mail message array. At DMA completion, an NVS manager is synchronously called to perform a commit records operation with the commit records message in the mail message structure. In response to the commit records operation completing, there is an indication that a new write DMA is allowed to proceed for the NVS track.

15 Claims, 16 Drawing Sheets

(51) Int. Cl.
*G06F 9/54* (2006.01)
*G06F 13/40* (2006.01)
*G06F 13/42* (2006.01)

(56) References Cited

U.S. PATENT DOCUMENTS

| | | | |
|---|---|---|---|
| 9,135,262 | B2 | 9/2015 | Perrin et al. |
| 9,372,630 | B2 | 6/2016 | Guo et al. |
| 9,405,669 | B2 | 8/2016 | Ash et al. |
| 2004/0250022 | A1 | 12/2004 | Jarvis et al. |
| 2005/0198446 | A1* | 9/2005 | Ash .................. G06F 11/1441 711/149 |
| 2007/0118698 | A1 | 5/2007 | LaFrese et al. |
| 2007/0186058 | A1 | 8/2007 | Ash et al. |
| 2009/0300298 | A1 | 12/2009 | Ash et al. |
| 2010/0202236 | A1 | 8/2010 | Kahler et al. |
| 2010/0318742 | A1 | 12/2010 | Plondke et al. |
| 2014/0025872 | A1 | 1/2014 | Flynn et al. |
| 2014/0281131 | A1 | 9/2014 | Joshi et al. |
| 2016/0034188 | A1* | 2/2016 | Bisht ..................... G06F 3/061 710/53 |
| 2016/0357452 | A1* | 12/2016 | Kadam .................. G11B 5/012 |
| 2017/0003894 | A1 | 1/2017 | Hess et al. |
| 2017/0109283 | A1 | 4/2017 | Ash et al. |

OTHER PUBLICATIONS

US Patent Application, filed Sep. 5, 2017, for U.S. Appl. No. 15/696,070, filed Sep. 5, 2017, invented by Kyler A. Anderson et al., Total 54 pages.

List of IBM Patents or Patent Applications Treated as Related, dated Sep. 7, 2017, Total 2 pp.

Office Action, dated Oct. 30, 2018, for U.S. Appl. No. 15/696,037, filed Sep. 5, 2017, Total 39 pages.

Response to Office Action, dated Jan. 30, 2019, for U.S. Appl. No. 15/696,037, filed Sep. 5, 2017, Total 14 pages.

Office Action, dated Oct. 2, 2018, for U.S. Appl. No. 15/696,070, filed Sep. 5, 2017, Total 21 pages.

Response to Office Action, dated Jan. 2, 2019, for U.S. Appl. No. 15/696,070, filed Sep. 5, 2017, Total 13 pages.

Notice of Allowance, dated Aug. 26, 2019, for U.S. Appl. No. 15/696,070, filed Sep. 5, 2017, Total 17 pages.

Office Action, dated Aug. 7, 2019, for U.S. Appl. No. 15/696,037, filed Sep. 5, 2017, Total 44 pages.

Response to Office Action, dated Nov. 7, 2019, for U.S. Appl. No. 15/696,037, filed Sep. 5, 2017, Total 18 pages.

Final Office Action, dated Mar. 22, 2019, for U.S. Appl. No. 15/696,037, filed Sep. 5, 2017, Total 45 pages.

Response to Final Office Action, dated Jun. 24, 2019, for U.S. Appl. No. 15/696,037, filed Sep. 5, 2017, Total 16 pages.

Notice of Allowance, dated Apr. 8, 2019, for U.S. Appl. No. 15/696,070, filed Sep. 5, 2017, Total 17 pages.

Webster's New World College Dictionary, Third Edition, dated 1997, Total 4 pages.

Microsoft Computer Dictionary, Fifth Edition, dated 2002, Total 4 pages.

US Patent Application, dated Nov. 21, 2019, for U.S. Appl. No. 16/690,724, filed Nov. 21, 2019, invented by K. Anderson, Total 54 pages.

Preliminary Amendment, dated Nov. 21, 2019, for U.S. Appl. No. 16/690,724, filed Nov. 21, 2019, invented by K. Anderson, Total 8 pages.

Final Office Action, dated Feb. 14, 2020 for U.S. Appl. No. 15/696,037, invented by Kyler A. Anderson, Total 46 pages.

List of Patents and Publications Treated as Related, dated Feb. 28, 2020, Total 2 pages.

Response, dated May 13, 2020, to Final Office Action, dated Feb. 14, 2020, for U.S. Appl. No. 15/696,037 (18.739), invented by Kyler A. Anderson, Total 16 pages.

* cited by examiner

SYNCHRONOUSLY PERFORMING COMMIT RECORDS OPERATIONS

BACKGROUND OF THE INVENTION

1. Field of the Invention

The present invention relates to a computer program product, system, and method for synchronously performing commit records operations.

2. Description of the Related Art

In a storage environment, a host system may communicate a read/write request to a connected storage system over a network channel through a network adaptor. The storage system includes a cache and Non-Volatile Storage (NVS).

For a write request, the host system splits the write request into a cache operation for a cache node and an NVS operation for an NVS node. Both operations have to complete successfully for the write request to succeed, otherwise, the write request is failed.

In traditional systems, write requests to the cache node and the NVS node were asynchronous thru a network and a host adapter. The host would write the data as one or more records to the storage system host adapter, then the storage system host adapter would write the data to the cache and NVS track buffer of the NVS node and send an asynchronous mail message to the NVS node to commit the one or more records in the NVS track buffer. Once the NVS node processed the commit, which involved updating the track buffer, the NVS node responded with a mail message to the storage system host adapter that indicated that the next write to the next record could begin. Once all records were written to the NVS, the storage system host adapter would send an asynchronous mail message to the NVS node to commit a track in the NVS track buffer, which resulted in the NVS node either creating a new NVS track or merging the new track data with the N-1 track data.

If any failure occurred prior to the NVS node committing the full track, the NVS node would commit all previously successful committed records (since the host was given good completion status). With such traditional systems, the host was also not allowed to re-write any record on a track until after a commit track request to the NVS node was completed (e.g., the host could commit record 1, then commit record 2, then commit record 3, but could not commit record 1, then commit record 1 again).

For the split write request, It is desirous to maintain a valid previous copy (N-1) of data in the NVS. Thus, an update in place cannot be used to write data into the NVS as this will write over the previous copy of the data.

Currently commit operations into the NVS are performed through asynchronous mail messages. However, such asynchronous mail message processing may not meet time limitations desired for the write request.

Thus, there is a need in the art for improved techniques for synchronously performing commit records operations.

SUMMARY

A computer program product is provided for synchronously performing commit records operations. The computer program product comprises a computer readable storage medium having program code embodied therewith, the program code executable by at least one processor to perform: building a local copy of a commit records message for a Non-Volatile Storage (NVS) track, with a valid indicator set to indicate that this commit records message is valid and has not been processed yet; executing a Direct Memory Access (DMA) chain to transfer customer data from a host to real segments and alternate segments of a track buffer and to transfer the local copy of the commit records message to a mail message structure of a mail message array; at DMA completion, synchronously calling an NVS manager to perform a commit records operation with the commit records message in the mail message structure; and, in response to the commit records operation completing, indicating that a new write DMA is allowed to proceed for the NVS track.

A computer system is provided for synchronously performing commit records operations. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: building a local copy of a commit records message for a Non-Volatile Storage (NVS) track, with a valid indicator set to indicate that this commit records message is valid and has not been processed yet; executing a Direct Memory Access (DMA) chain to transfer customer data from a host to real segments and alternate segments of a track buffer and to transfer the local copy of the commit records message to a mail message structure of a mail message array; at DMA completion, synchronously calling an NVS manager to perform a commit records operation with the commit records message in the mail message structure; and, in response to the commit records operation completing, indicating that a new write DMA is allowed to proceed for the NVS track.

A method is provided for synchronously performing commit records operations. The method comprises: building, using a processor of a computer, a local copy of a commit records message for a Non-Volatile Storage (NVS) track, with a valid indicator set to indicate that this commit records message is valid and has not been processed yet; executing a Direct Memory Access (DMA) chain to transfer customer data from a host to real segments and alternate segments of a track buffer and to transfer the local copy of the commit records message to a mail message structure of a mail message array; at DMA completion, synchronously calling an NVS manager to perform a commit records operation with the commit records message in the mail message structure; and, in response to the commit records operation completing, indicating that a new write DMA is allowed to proceed for the NVS track.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In a storage environment, a host system may first communicate a read/write request to a connected storage system over a fast channel, such as a bus interface, such as the Peripheral Component Interconnect Express (PCIe) interface. This may be described as a connection that is point to point optical PCIe. This design allows for very low latency random reads and small block sequential writes.

For a read/write request over the fast channel which is supposed to complete within a threshold time, the host system holds the application thread for the read/write request in a spin loop waiting for the request to complete. This saves processor time associated with a context swap, which deactivates the thread (i.e., puts the thread to sleep) and reactivates the thread (i.e., re-dispatches the thread) in response to an interrupt when a response to the read/write request is received.

With embodiments, reference will be made herein to "N" newly written data and "N−1" previously written, hardened data. Hardened data may be described as previously written data in which the storage system has provided completion status of the write to the host. This may be the N−1 version of the complete track or the N−1 version of a record written into a track buffer of the NVS.

Embodiments synchronously perform commit records operations to meet time limitations for processing the write request since this work needs to be performed synchronously on the thread.

Figure 1:
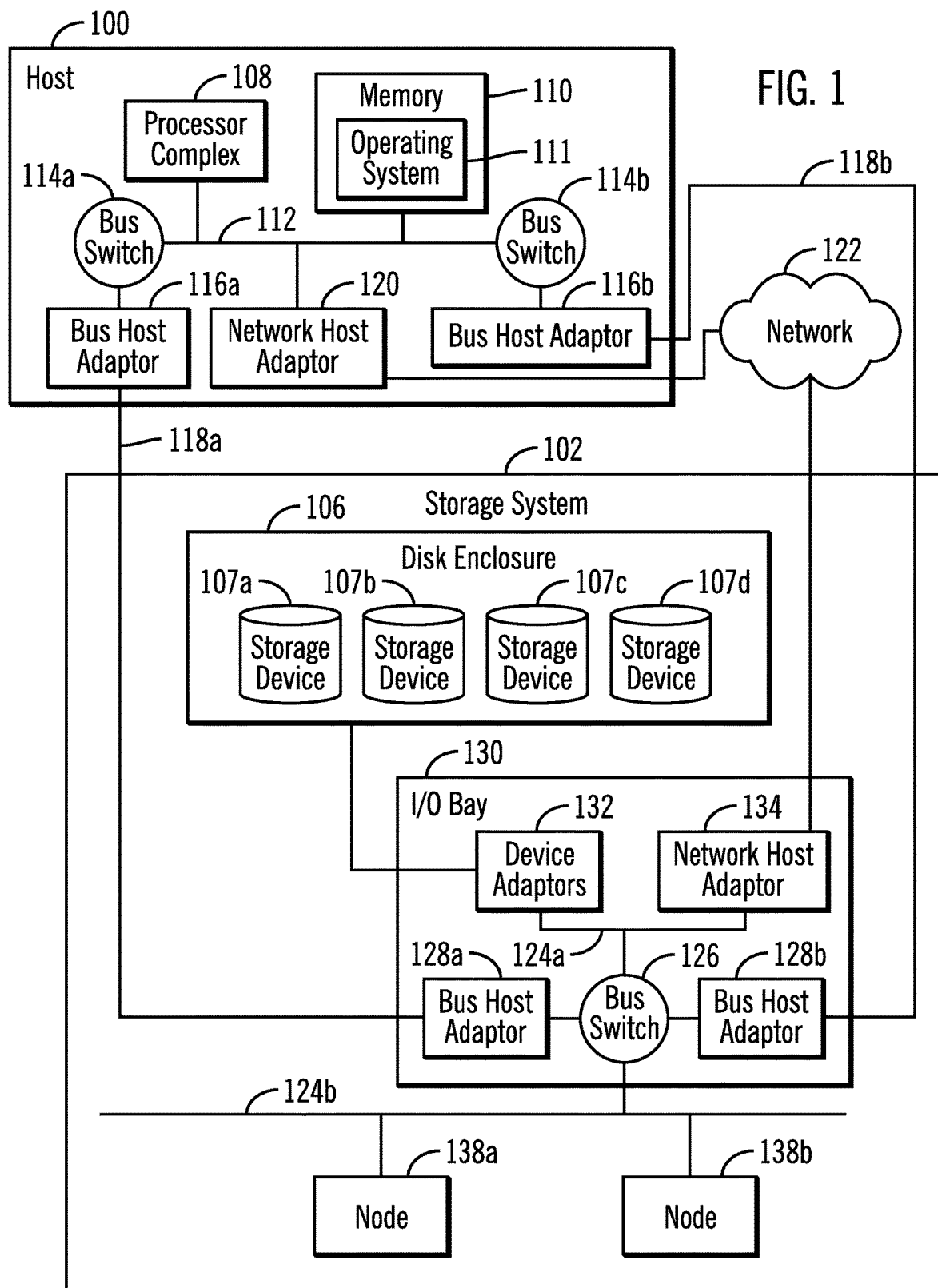
FIG. 1 illustrates an embodiment of a storage environment in accordance with certain embodiments.

FIG. 1 illustrates an embodiment of a storage environment in accordance with certain embodiments. In FIG. 1, a host 100 directs read and write requests to a storage system 102 to access tracks in volumes configured in storage devices 107a, 107b, 107c, 107d in a disk enclosure 106. The host 100 includes a processor complex 108 of one or more processor devices and a memory 110 including an operating system 111 executed by the processor complex 108. The host operating system 111 generates read and write requests to tracks configured in the storage devices 107a, 107b, 107c, 107d.

The host 100 includes hardware to communicate read and write requests on different channels. A first channel is a bus interface, such as a Peripheral Component Interconnect Express (PCIe), including a bus 112, bus switches 114a, 114b to connect one or more devices on the bus 112, including the processor complex 108, a memory 110, a bus host adaptor 116a to extend the bus interface over an external bus interface cable 118a to the storage system 102, and a bus host adaptor 116b to extend the bus interface over an external bus interface cable 118b to the storage system 102. Additional bus interface technology to extend the bus interface may be utilized, including PCIe extender cables or components, such as a distributed PCIe switch, to allow PCIe over Ethernet, such as with the ExpEther technology. In additional embodiments, there may be one bus switch instead of bus switches 114a, 114b.

A second channel to connect the host 100 and storage system 102 uses a network host adaptor 120, connected to the bus 112, that connects to a separate network 122 over which the host 100 and storage system 102 additionally communicate. The first channel through the bus interface may comprise a faster access channel than the network 122 interface through the network host adaptor 120.

The storage system 102 includes a bus interface comprising a bus 124a, 124b, a bus switch 126 to connect to endpoint devices on the bus 124a, 124b, a bus host adaptor 128a to connect to the external bus interface cable 118a to allow communication over the bus interface to the host 100, and a bus host adaptor 128b to connect to the external bus interface cable 118b to allow communication over the bus interface to the host 100. The storage system 102 includes an Input/Output bay 130 having the bus host adaptor 128a, the bust host adaptor 128b, one or more device adaptors 132 to connect to the storage devices 107a, 107b, 107c, 107d, and one or more network host adaptors 134 to connect to the network 122 and host systems. Although one bus switch 126 is illustrated, more than one bus switch 126 may be included in the storage system 102.

The storage system 102 includes node 138a, and node 138b, which are coupled to bus 124b. The devices 138a, 138b, 128a, 128b, 132, and 134 connect over the bus interface implemented in the bus lanes 124a, 124b and bus switch 126.

Figure 2:
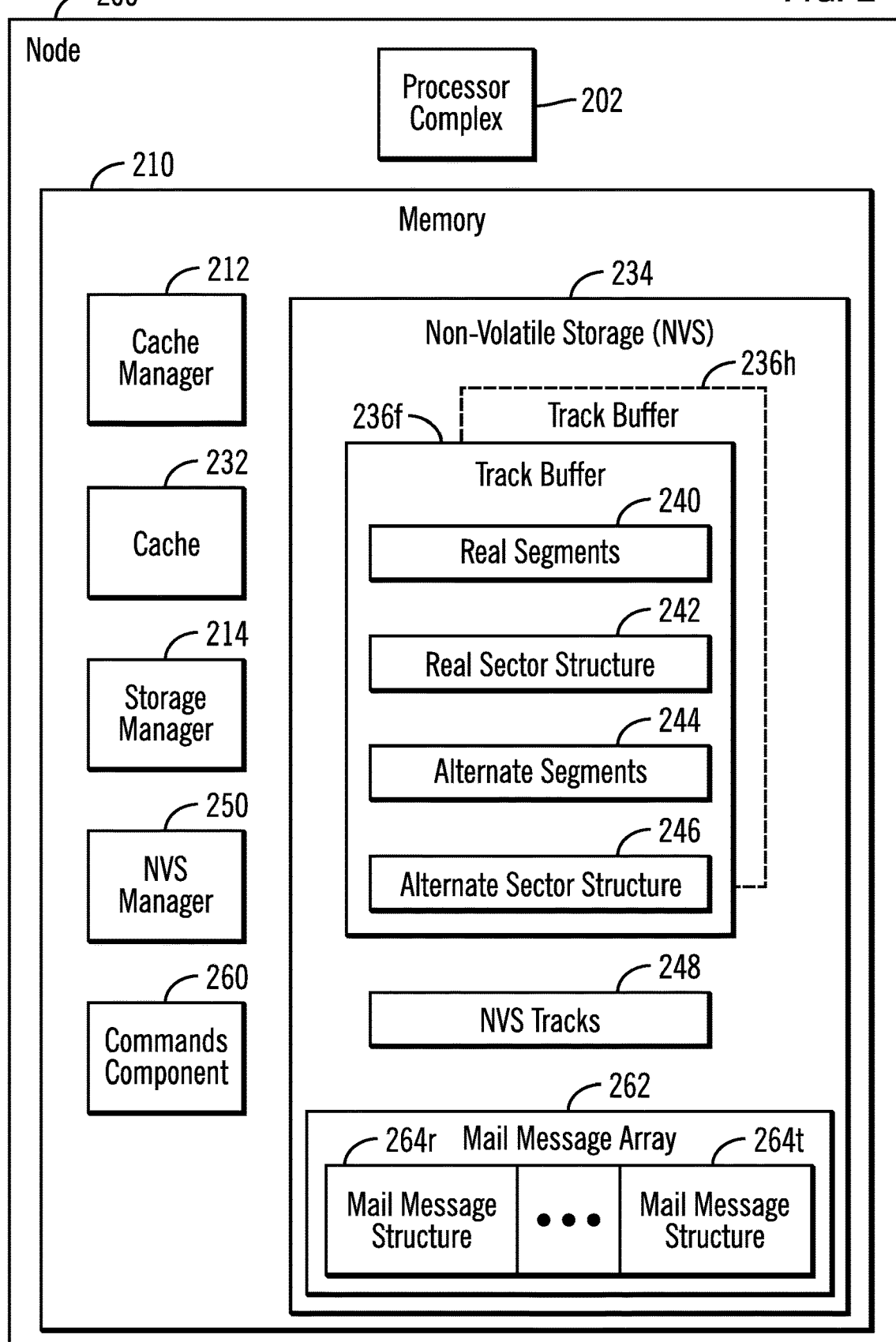
FIG. 2 illustrates details of a node in accordance with certain embodiments.

FIG. 2 illustrates details of a node 200 in accordance with certain embodiments. Nodes 138a, 138b may each implement the architecture of node 200 in accordance with embodiments. Node 200 includes a processor complex 202 of one or more processor devices and a memory 210. The memory 210 includes a cache manager 212, a storage manager 214, a cache 232, Non-Volatile Storage (NVS) 234, and an NVS manager 250. In addition, the memory 210 includes a commands component 260.

The cache 232 is used to cache tracks accessed by the connected host 100. The storage manager 214 manages access requests from processes in the host 100 and storage system 102 for tracks in the storage 107a, 107b, 107c, 107d.

With embodiments, the cache 232 is comprised of 4 KiloByte (KB) segments. With embodiments, each segment is comprised of 8 sectors, and each sector is 512 bytes for Count Key Data (CKD). With embodiments, a track is comprised of a varying number of records. With embodiments, a record is comprised of a varying number of sectors across a varying number of segments.

The cache manager 212 maintains accessed tracks in the cache 232 for future read access to the tracks to allow the accessed tracks to be returned from the faster access cache 232 instead of having to retrieve from the storage devices 107a, 107b, 107c, 107d. Further, tracks in the cache 232 may be updated by writes. A track may comprise any unit of data configured in the storage devices 107a, 107b, 107c, 107d, such as a track, Logical Block Address (LBA), etc., which is part of a larger grouping of tracks, such as a volume, logical device, etc.

With embodiments, the NVS 234 is comprised of 4 KB segments. With embodiments, each segment is comprised of 8 sectors, and each sector is 512 bytes for CKD. With embodiments, a track is comprised of a varying number of records. With embodiments, a record is comprised of a varying number of sectors across a varying number of segments.

The NVS manager 250 is used to manage NVS tracks 248 in the NVS 234 and a mail message array 262. The NVS 234 includes one or more track buffers 236f . . . 236h, NVS tracks 248, and the mail message array 262. The NVS manager 250 maintains hardened, previously written tracks in NVS tracks 248 and maintains tracks currently being written in the track buffer 236f . . . 236h. The mail message array 262 includes one or more mail message structures 264r . . . 264t. Each mail message structure 264r . . . 264t stores one or more messages, such as a one or more commit records messages. Different mail message structures may store different types of messages (e.g., messages other than commit records messages).

Each track buffer 236f . . . 236h may include the components of track buffer 236f. The track buffer 236f includes real segments 240, a real sector structure 242, alternate segments 244, and an alternate sector structure 246. Embodiments allow intermediate writes to alternatively write to the real segments 240 and alternate segments 244, while updating the real sector structure 242 and the alternate sector structure 246. A track has records, and updating a track may update one record of the track, a subset of records of the track or all records of the track.

The NVS 234 uses track buffers, such as track buffer 236f. The track buffer 236f contains real segments 240 and alternate segments 244 that each hold an entire track. The track buffer 236f holds newly written (N) data of a track until a write request is complete. Then, if a previously written N-1 version of the track exists in the NVS tracks 248, the newly written N track is merged with the previously written N-1 track. Otherwise, the newly written N track in the real segments 240 is maintained as a new NVS track 248. Once complete, the real segments 240 are replenished with free (not currently used) NVS segments. With embodiments, there are M track buffers 236f . . . 236h based on the overall size of the NVS 234 and the number of bus host adaptors 128a, 128b.

With embodiments, the real segments 240 are a set of free segments within the NVS 234 and can hold a track. These are replenished after each use. With embodiments, the alternate segments 244 are a set of dedicated segments that can hold a track, and are not replenished, but are re-used for each write to the track buffer 236f.

With embodiments, once all writes to a track in a track buffer 236f are complete, the track and track buffer 236f cannot be overwritten until after newly written N data is merged with the hardened N-1 data or until a new NVS track 248 is created using the real segments 240. The hardening process may be an asynchronous and time consuming process that may not complete within a desired period of time (i.e., may not meet time limitations of the fast channel).

With embodiments, the NVS manager 250 advantageously enables records ("blocks") on a track be rewritten with little time in between updates. Also, the NVS manager 250 advantageously marks sectors modified in the real sector structure 242 and the alternate sector structure 246, which is a simple operation that is performed quickly (i.e., within a desired time limitation of the fast channel). The previously written N-1 data is kept so that, if there is any error that prevents the entire record from being written, embodiments are able to use or restore the previously written copy of the data (e.g., during intermediate writes, the N-1 record "x" may be used if the N record "x" has an error). Thus, embodiments avoid using an update in place for the NVS write request. Instead, embodiments advantageously write new data to a new location, either the real segments 240 or the alternate segments 244.

A write request for a track may consist of multiple intermediate writes to records (e.g., write record 1, then record 1, then record 1, then record 2). With embodiments, the host may advantageously write to a record and write to that record again (e.g., write record 1 and write record 1). In particular, embodiments advantageously perform multiple intermediate writes to the same record, while preserving the valid N-1 version of the intermediate write, prior to merging the newly written N data with the hardened, previously written N-1 data. An intermediate write may be described as part of a write request before the data that is written is hardened.

With embodiments, write requests from the host 100 write to records in forward order, but records may be skipped. For example, the host 100 may write record 1, then record 3, then record 5, then record 7, etc.

One of the nodes 138a, 138b is a cache node, and the other of the nodes 138a, 138b is an NVS node. The cache node performs cache 232 processing, while the NVS node performs NVS 234 processing. With embodiments, the cache on node 138a is backed up by the NVS on node 138b, while the cache on node 138b is backed up by the NVS on node 138a. When writing to the cache on node 138a, the bus host adaptor 128a is used, while bus host adaptor 128b is used to write to the NVS on node 138b. Likewise, when writing to the cache on node 138b, bus host adaptor 128b is used, while bus host adaptor 128a is used to write to the NVS on node 138a.

In certain embodiments, there may be multiple hosts 100 that connect to the storage system 102 over the first and second channels to access tracks in the storage devices 107a, 107b, 107c, 107d. In such case, the storage system 102 would have two bus host adaptors 128a, 128b to connect to the bus interfaces 118a, 118b of each connected host 100 and one or more network host adaptors 134 to connect to the network host adaptors 120 on the hosts 100.

In one embodiment, the bus interfaces 112, 114a, 114b, 116a, 116b, 118a, 118b, 124a, 124b, 126, 128a, and 128b may comprise a Peripheral Component Interconnect Express (PCIe) bus interface technology. In alternative embodiments, the bus interfaces 112, 114a, 114b, 116a, 116b, 118a, 118b, 124a, 124b, 126, 128a, and 128b may utilize suitable bus interface technology other than PCIe. The bus host adaptors 116a, 116b, 128a, and 128b may comprise PCIe host adaptors that provide the interface to connect to the PCIe cables 118a, 118b. The network 122 may comprise a Storage Area Network (SAN), a Local Area Network (LAN), a Wide Area Network (WAN), the Internet, an Intranet, etc., and the network host adaptors 120, 134 provide the network 122 connections between the host 100 and storage system 102.

The storage system 102 may comprise a storage system, such as the International Business Machines Corporation (IBM®) D58000® and DS8880 storage systems, or storage controllers and storage systems from other vendors. (IBM and DS8000 are trademarks of International Business Machines Corporation throughout the world). The host operating system 111 may comprise an operating system such as Z Systems Operating System (Z/OS®) from International Business Machines Corporation ("IBM") or other operating systems known in the art. (Z/OS is a registered trademark of IBM throughout the world).

The storage devices 107a, 107b, 107c, 107d in the disk enclosure 106 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STT-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 107a, 107b, 107c, 107d in the disk enclosure 106 may comprise heterogeneous storage devices from different vendors and different types of storage devices, such as a first type of storage devices, e.g., hard disk drives, that have a slower data transfer rate than a second type of storage devices, e.g., SSDs.

Figure 3:
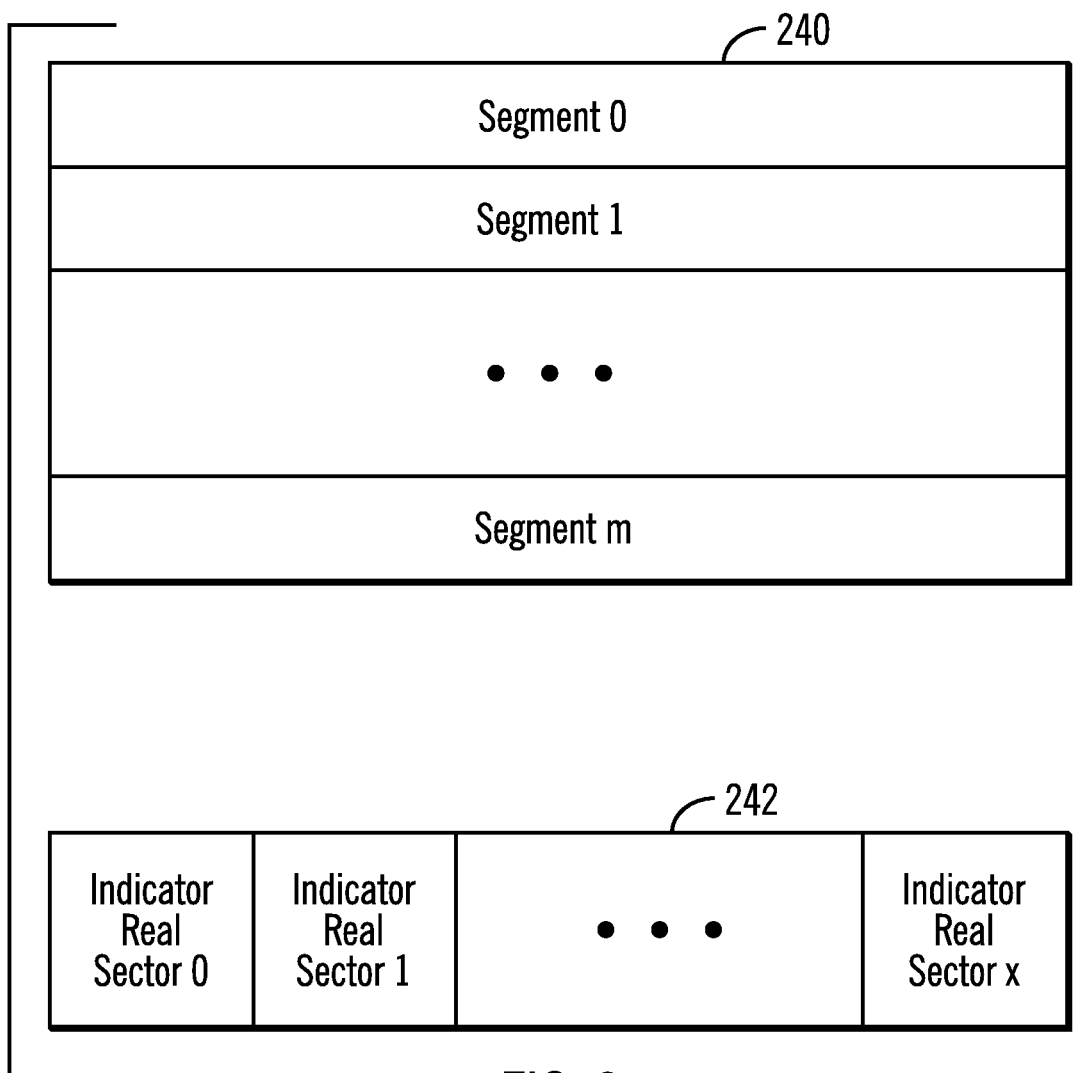
FIG. 3 illustrates details of real segments and a real sector structure in accordance with certain embodiments.

FIG. 3 illustrates details of real segments 240 and a real sector structure 242 in accordance with certain embodiments. The real segments 240 store data for segments: segment 0, segment 1, . . . segment m. In certain embodiments, the real segments 240 is an array of m+1 (m=13 for CKD, and the array has 14 elements, going from index 0-13) real NVS segment numbers currently used for the track buffer 236f. With embodiments, these segment number are replenished after each complete use. With embodiments, each segment contains 8 sectors.

The real sector structure 242 includes an indicator for each sector of each segment in the real segments 240. For example, the real sector structure 242 includes an indicator for real sector 0, an indicator for real sector 1, and an indicator for real sector x. With embodiments, x=111 for CKD. In certain embodiments, the real sector structure 242 is a bitmap, and the indicators are bits. An indicator for a sector has a first value (e.g., one or true) to indicate that data has been written for that sector into the real segments 240 and a second value (e.g., zero or false) to indicate that data has not been written for that sector into the real segments 240.

Figure 4:
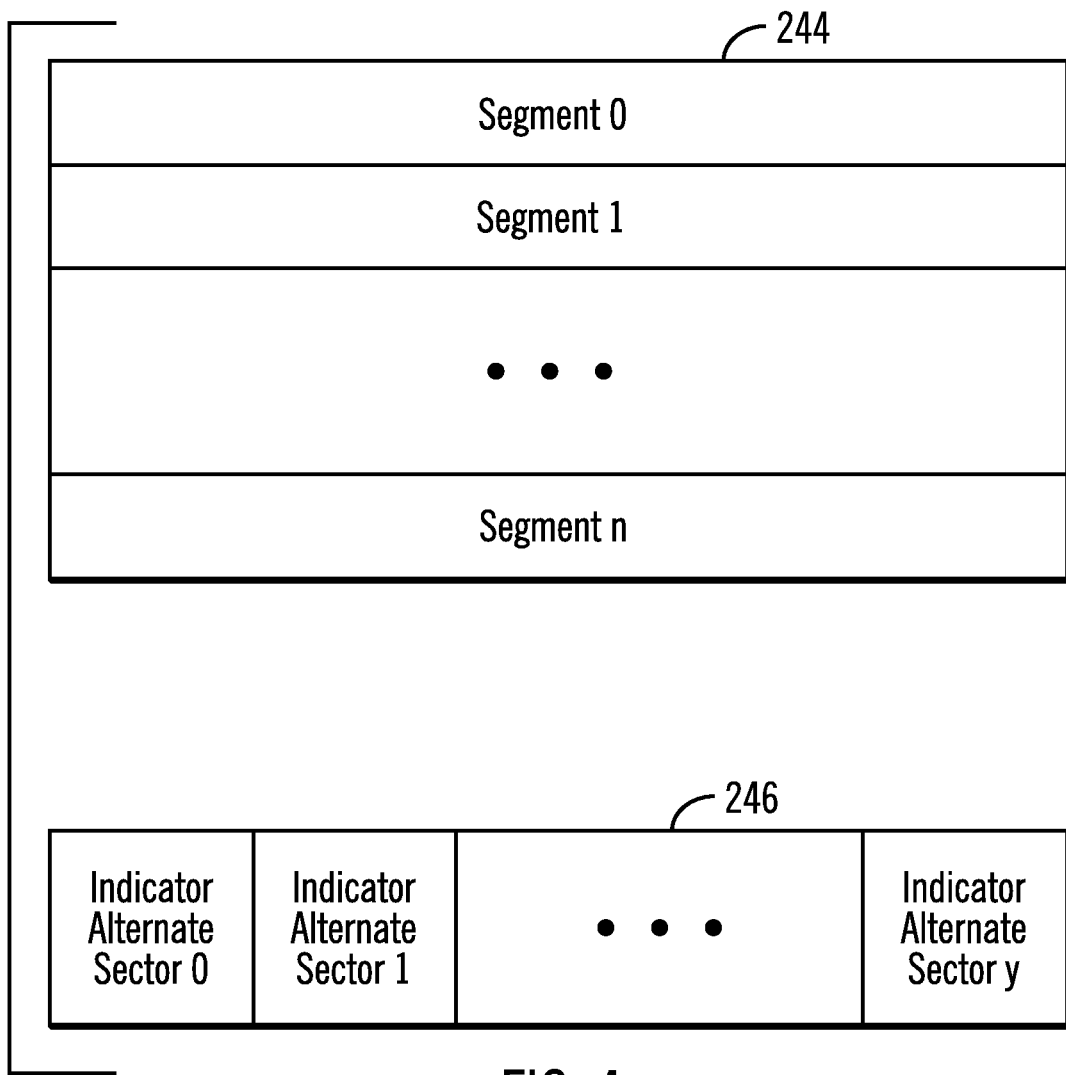
FIG. 4 illustrates details of alternate segments and an alternate sector structure in accordance with certain embodiments.

FIG. 4 illustrates details of alternate segments 244 and an alternate sector structure 246 in accordance with certain embodiments. The alternate segments 244 store data for sectors: sector 0, sector 1, . . . sector n. In certain embodiments, the alternate segments 244 is an array of n+1 (n=13 for CKD, and the array has 14 elements, going from index 0-13) dedicated NVS segment numbers always used for the track buffer 236f. With embodiments, these segment number are not replenished after each complete use. With embodiments, each segment contains 8 sectors.

The alternate sector structure 246 includes an indicator for each sector of each segment in the alternate segments 244. For example, the alternate sector structure 246 includes an indicator for alternate sector 0, an indicator for alternate sector 1, and an indicator for alternate sector y. With embodiments, y=111 for CKD. In certain embodiments, the alternate sector structure 246 is a bitmap, and the indicators are bits. An indicator for a sector has a first value (e.g., one or true) to indicate that data has been written for that sector into the alternate segments 244 and a second value (e.g., false or 0) to indicate that data has not been written for that sector into the alternate segments 244.

Figure 5:
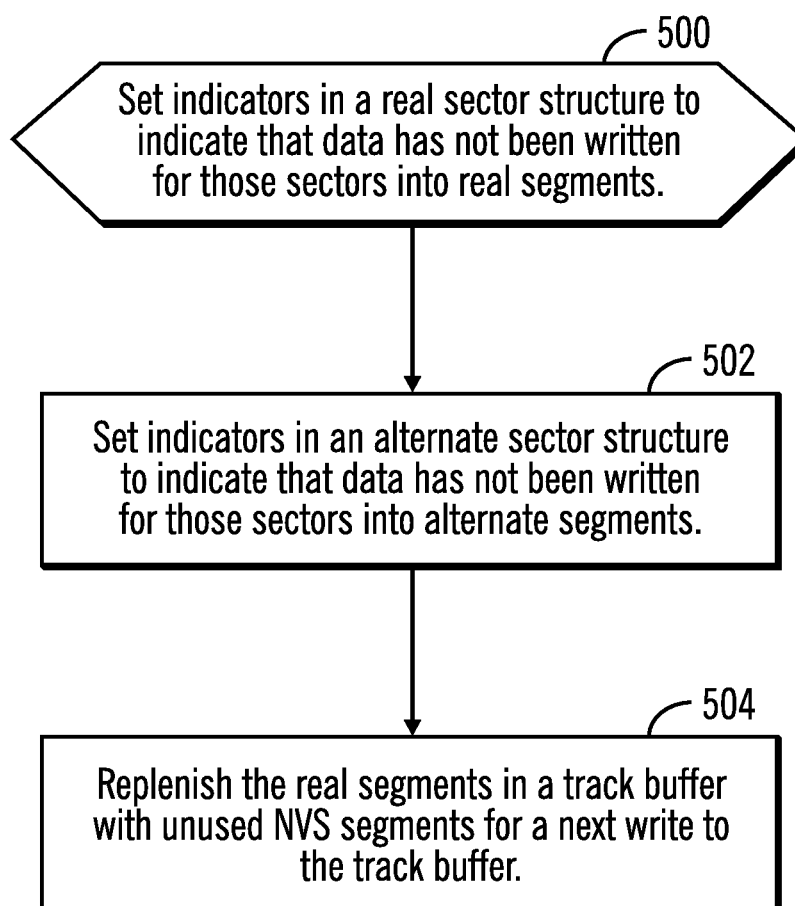
FIG. 5 illustrates, in a flowchart, operations for initialization of a track buffer in accordance with certain embodiments.

FIG. 5 illustrates, in a flowchart, operations for initialization of a track buffer 236f . . . 236h in accordance with certain embodiments. Control begins at block 500 with the NVS manager 250 setting indicators in the real sector structure 242 to indicate that data has not been written for those sectors into real segments 240. In block 502, the NVS manager 250 sets indicators in the alternate sector structure 246 to indicate that data has not been written for those sectors into alternate segments 244. In block 504, the NVS manager 250 replenishes the real segments in the track buffer with unused NVS segments for the next write to the track buffer. With embodiments, the initialization of FIG. 5 is done prior to each write.

FIGS. 6A, 6B, 6C, and 6D illustrated, in a flowchart, operations for using the real segments 240 and the alternate segments 244 in accordance with certain embodiments. Control begins at block 600 with the NVS manager 250, for a first write request for a track, writing data for the write request into one or more sectors of the real segments 240. In block 602 the NVS manager 250 sets one or more indicators in the real sector structure 242 to indicate that the one or more corresponding sectors have been written into the real segments 240. For example, each indicator may be set to one or true. In block 604 the NVS manager 250 sets one or more indicators in the alternate sector structure 246 to indicate that the one or more corresponding sectors have not been written into the alternate segments 244. For example, each indicator may be set to zero or false.

In block 606 the NVS manager 250 determines whether all write requests for the track have been completed. If so, processing continues from block 606 (FIG. 6A) to block 628 (FIG. 6D), otherwise, processing continues to block 608.

In block 608 the NVS manager 250 receives a new write request for the track. From block 608 (FIG. 6A), processing continues to block 610 (FIG. 6B).

In block 610 the NVS manager 250 determines whether data for a last write request for the track was written to one or more sectors of the real segments. If so, processing continues to block 612, otherwise, processing continues to block 620 (FIG. 6C).

In block 612 the NVS manager 250 writes data for the new write request into one or more sectors of the alternate segments 244. In block 614 the NVS manager 250 sets one or more indicators in the alternate sector structure 246 to indicate that the one or more corresponding sectors have been written in the alternate segments 244. For example, each indicator may be set to one or true. In block 616 the NVS manager 250 sets one or more indicators in the real sector structure 242 to indicate that the one or more corresponding sectors have not been written in the real segments 240. For example, each indicator may be set to zero or false.

In block 618 the NVS manager 250 determines whether all write requests for the track have been completed. If so, processing continues from block 618 (FIG. 6B) to block 628

Figure 6A:
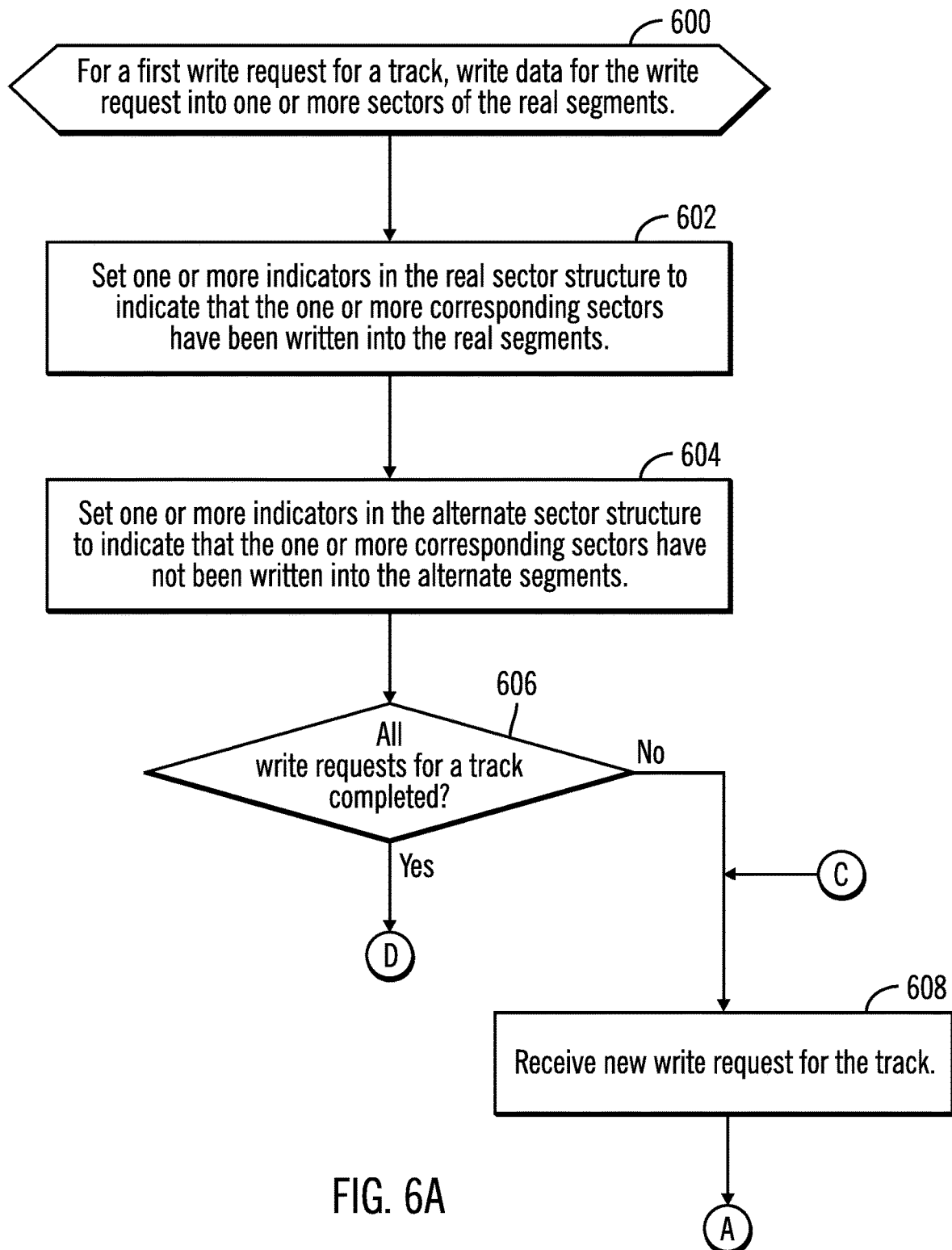
FIGS. 6A, 6B, 6C, and 6D illustrated, in a flowchart, operations for using real segments and alternate segments in accordance with certain embodiments.
Figure 6B:
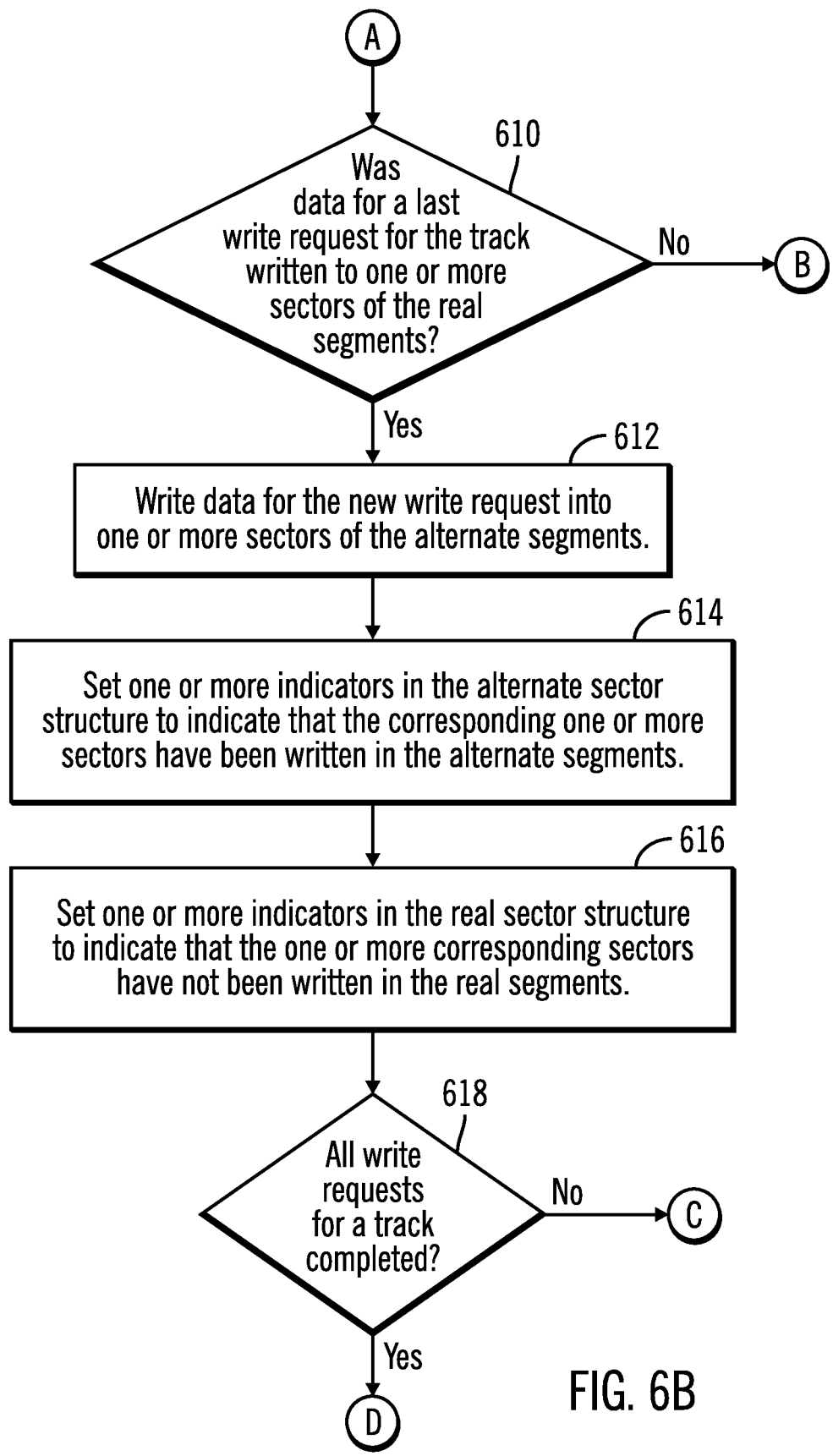
Figure 6C:
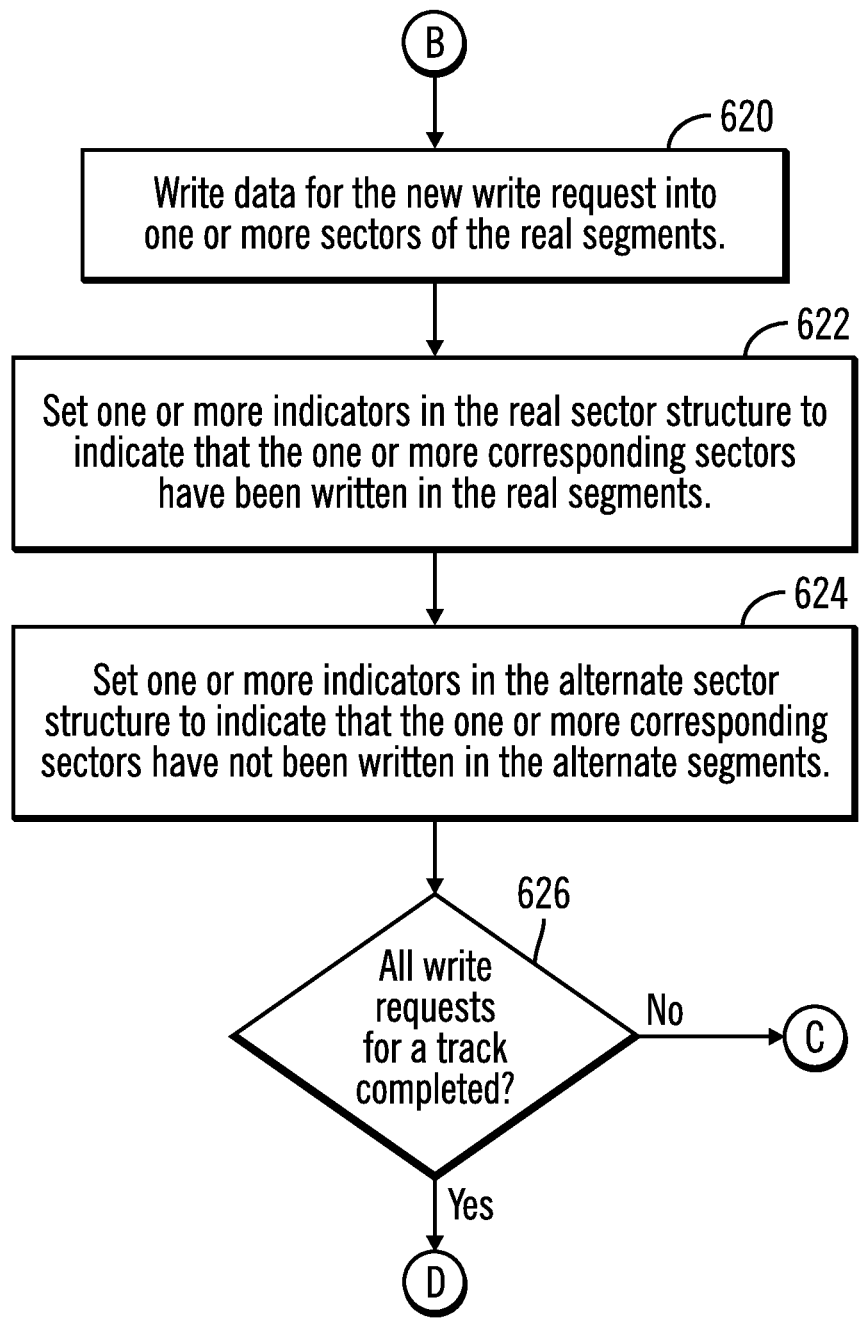
Figure 6D:
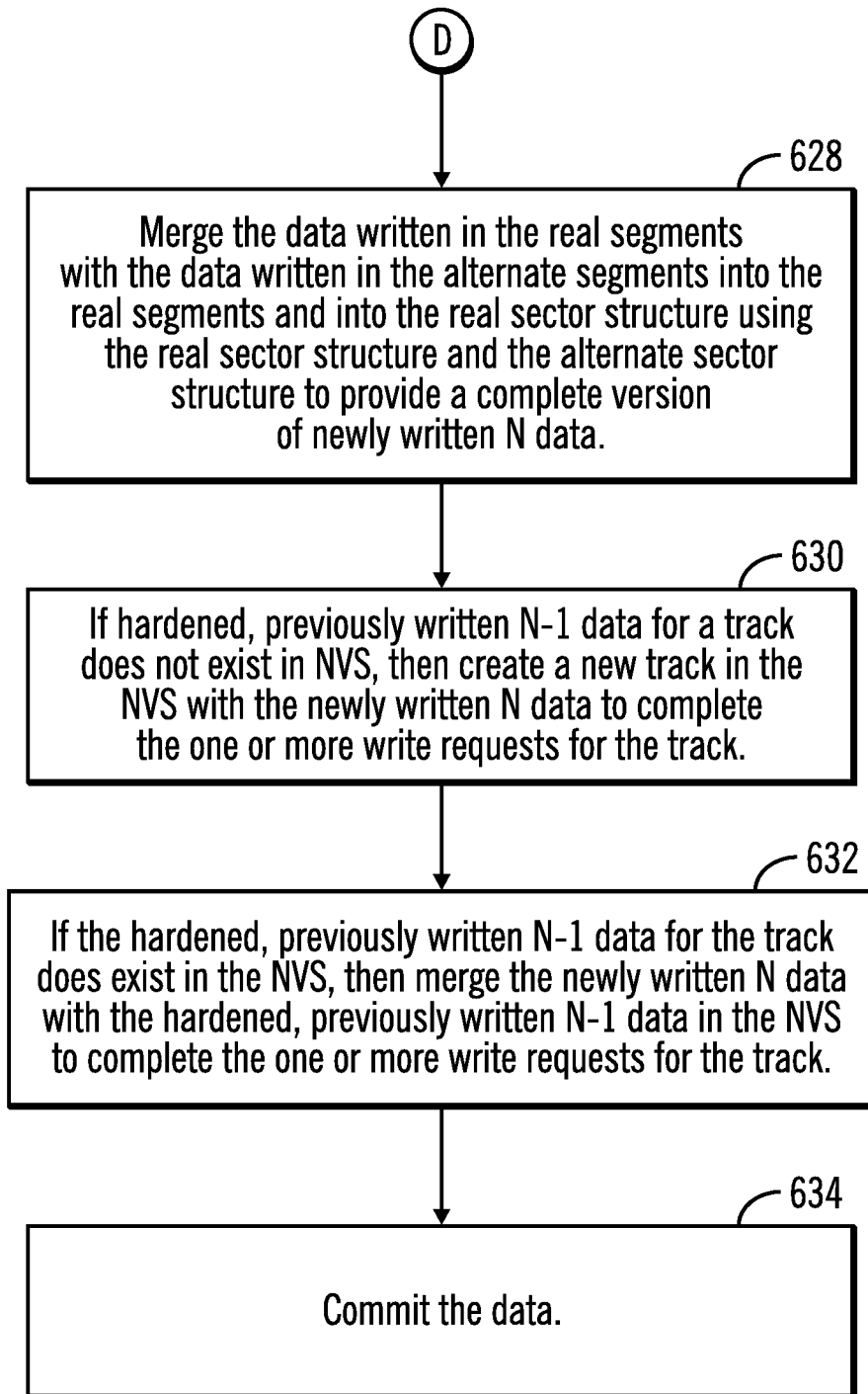

(FIG. 6D), otherwise, processing continues from block 618 (FIG. 6B) to block 608 (FIG. 6A).

Again, if the last write request for the track wrote data into the alternate segments 244, then processing continues to block 620. In block 620 the NVS manager 250 writes data for the new write request into one or more sectors of the real segments 240. In block 622 the NVS manager 250 sets one or more indicators in the real sector structure 242 to indicate that the one or more corresponding sectors have been written in the real segments 240. For example, each indicator may be set to one or true. In block 624 the NVS manager 250 sets one or more indicators in the alternate sector structure 246 to indicate that the one or more corresponding sectors have not been written in the alternate segments 244. For example, each indicator may be set to zero or false.

In block 626 the NVS manager 250 determines whether all write requests for the track have been completed. If so, processing continues from block 626 (FIG. 6C) to block 628 (FIG. 6D), otherwise, processing continues from block 626 (FIG. 6C) to block 608 (FIG. 6A).

In block 628 the NVS manager 250 merges the data written in the real segments 240 with the data written in the alternate segments 244 into the real segments and into the real sector structure using the real sector structure 242 and the alternate sector structure 246 to provide a complete version of newly written data ("N" data). In particular, the NVS manager 250 uses the indicators set in the real sector structure 242 to identify sectors of newly written data in the real segments 240 and uses the alternate sector structure 246 to identify sectors of newly written data in the alternate segments 244. The sectors for the newly written data from the real segments 240 and the alternate segments 244 are merged into the real segments 240. That is, data from the sectors stored in the alternate segments 244 are copied into the corresponding sectors of the real segments 240. Thus, upon write completion, the real sector structure 242 and the alternate sector structure 246 are merged to create the new write.

In block 630, if hardened, previously written N−1 data for a track does not exist in the NVS 234, then, the NVS manager 250 creates a new track in the NVS 234 with the newly written N data to complete the one or more write requests for the track.

In block 632, if a hardened, previously written N−1 data for the track does exist in the NVS 234, then, the NVS manager 250 merges the complete version of the newly written N data with the hardened, previously written N−1 data in the NVS 234 to complete the one or more write requests for the track.

With embodiments, the N−1 data is stored in the NVS tracks 248. This merging overwrites the hardened, previously written data.

In block 634, the NVS manager 250 commits the merged data. Once the commit is complete, the NVS node notifies the cache node (could be the same or alternate node) that the NVS write is complete and the cache node can perform cache write request complete processing.

Thus, with embodiments, after the first write request, the data for each subsequent write request is transferred alternatively to the real segments 240 or the alternate segments 244. For example, write request 1 for sector 2 is transferred to the real segments 240, the indicator for sector 2 in the real sector structure 242 is set to indicate the write was into sector 2 of the real segments 240, and the indicator for sector 2 in the alternate sector structure 246 is set to indicate that the write was not into sector 2 of the alternate segments 244. Continuing with the example, write request 2 for sector 3 is transferred to the alternate segments 244, the indicator for sector 3 in the alternate sector structure 246 is set to indicate that the write was into sector 3 of the alternate segments 244, and the indicator for sector 3 in the real sector structure 242 is set to indicate the write was not into sector 3 of the real segments 240. As a further example, write request 3 for sector 4 is transferred to the real segments 240, the indicator for sector 4 in the real sector structure 242 is set to indicate the write was into sector 4 of the real segments 240, and the indicator for sector 4 in the alternate sector structure 246 is set to indicate that the write was not into sector 4 of the alternate segments 244. This alternative use of the real segments 240 and the alternative segments 246 continues until the intermediate writes are complete.

With embodiments, setting (e.g., to one or true) and resetting (e.g., to zero or false) the indicators of the real sector structure 242 and the alternate sector structure 246 may be performed within the time limitation desired by the fast channel.

Also, once the write requests for the track are complete, the NVS manager 250 may perform an asynchronous process to merge the newly written (N) data in the alternate segments with the newly written data in the real segments to provide a complete version of the new N data. Then, the NVS manager 250 merges the newly written N data with the hardened, previously written N−1 data or creates a new NVS track 248 with the newly written N data, to complete the write requests for the track.

Embodiments modify the NVS 234 to include the alternate segments 244 and the alternate sector structure 246, so that the incoming writes switch between the real segments 240 and the alternate segments 244. Thus, the latest segment data is used when the writes complete, where the latest data before the last write is preserved in segments of the NVS 234.

Figure 7:
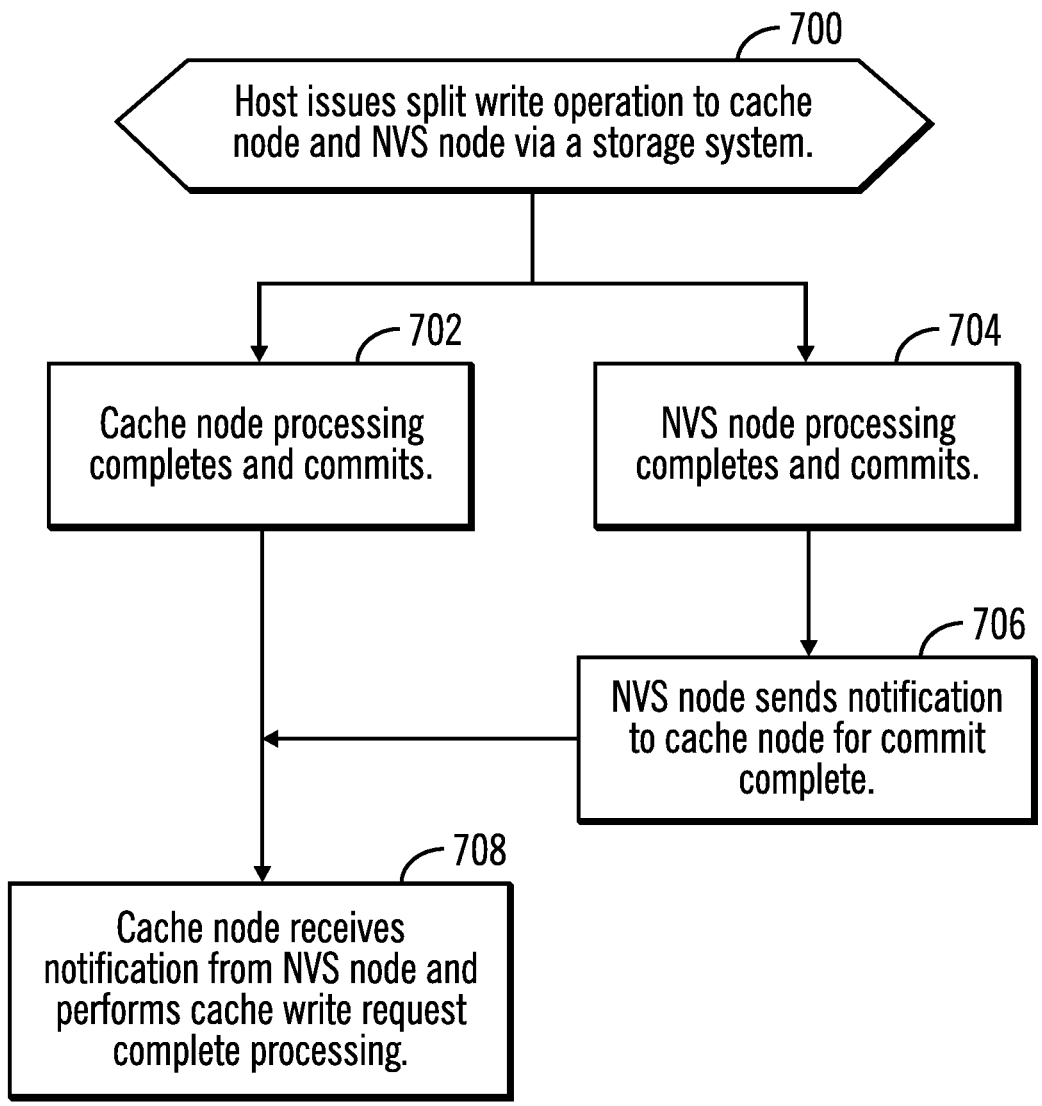
FIG. 7 illustrates, in a flowchart, operations for a split write request in accordance with certain embodiments.

FIG. 7 illustrates, in a flowchart, operations for a split write request in accordance with certain embodiments. Control begins at block 700 with the host 100 issuing a split write request to a cache node and an NVS node via the storage system 102. One of the nodes 138a, 138b is the cache node, and the other of the nodes 138a, 138b is the NVS node. The cache node performs cache 232 processing, while the NVS node performs NVS 234 processing.

In block 702, the cache node processing completes and commits. In block 704, the NVS node processing completes and commits. In block 706, the NVS node sends a notification to the cache node for commit complete. In block 708, the cache node receives notification from the NVS node and performs cache write request complete processing.

Figure 8:
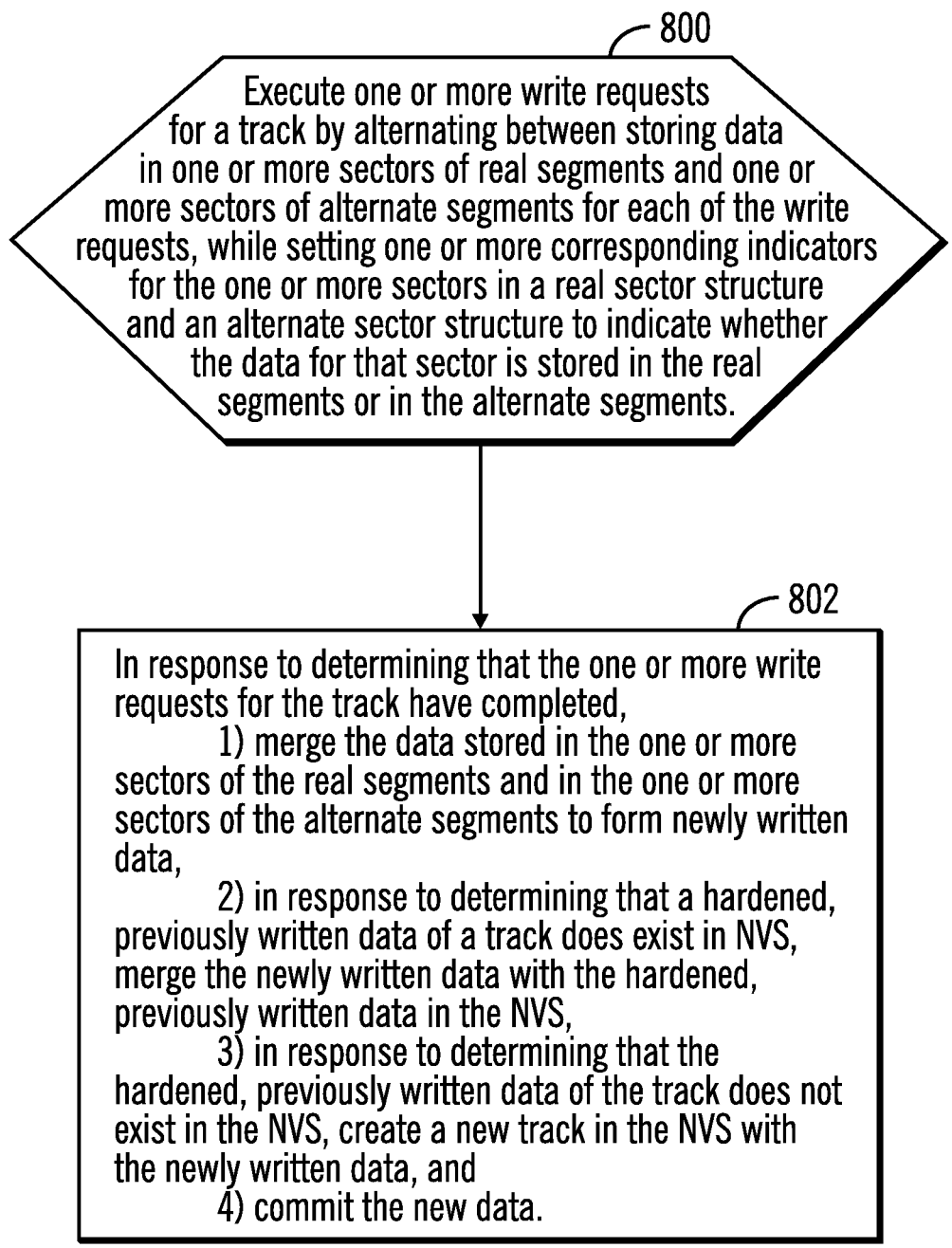
FIG. 8 illustrates, in a flowchart, operations for NVS processing in accordance with certain embodiments.

FIG. 8 illustrates, in a flowchart, operations for NVS processing in accordance with certain embodiments. Control begins at block 800 with the NVS manager 250 executing one or more write requests for a track by alternating between storing data in one or more sectors of real segments and one or more sectors of alternate segments for each of the write requests, while setting one or more corresponding indicators for the one or more sectors in a real sector structure and an alternate sector structure to indicate whether the data for that sector is stored in the real segments or in the alternate segments. In block 802, in response to determining that the one or more write requests for the track have completed, the NVS manager 250 1) merges the data stored in the one or more sectors of the real segments and in the one or more sectors of the alternate segments to form newly written data, 2) in response to determining that a hardened, previously written data of a track does exist in NVS, merges the newly written data with the hardened, previously written data in the NVS, 3) in response to determining that the hardened, previously written data of the track does not exist in the NVS, creates a new track in the NVS with the newly written data; and 4) commits the new data.

Synchronously Performing Commit Records Operations

Figure 9:
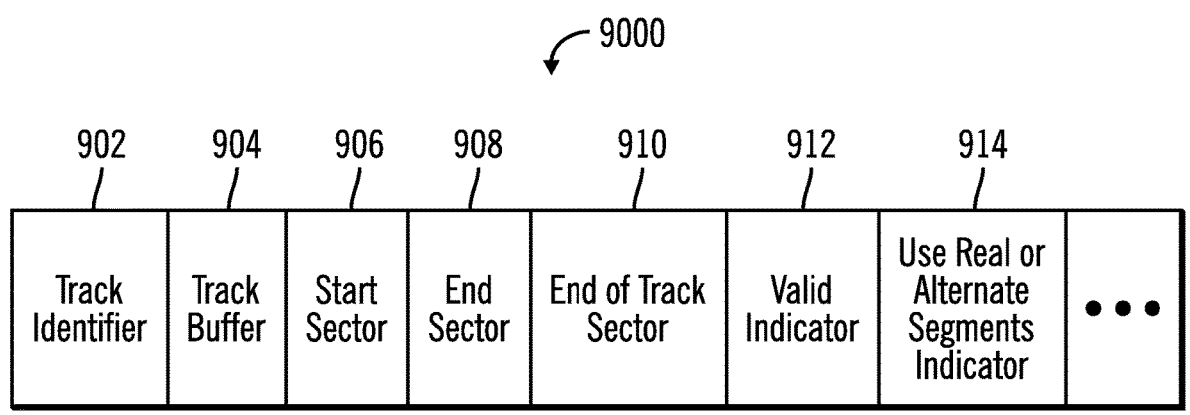
FIG. 9 illustrates an example commit records message in accordance with certain embodiments.

FIG. 9 illustrates an example commit records message 9000 in accordance with certain embodiments. The commit records message 9000 includes a track identifier 902 to identify an NVS track 248, a track buffer 904 of the NVS node, a start sector 906 for the NVS track 248, an end sector 908 for the NVS track 248, an end of track sector 910, a valid indicator 912, a use real or alternate segments indicator 914, and may include other elements as indicated by the ellipses. The valid indicator 912 may be set to a first value (e.g., one or true) to indicate that the commit records message 9000 is valid and ready to be processed and to a second value (e.g., zero or false) to indicate that the commit records message 9000 has already been processed. The start sector 906 and the end sector 908 are used for a current commit of a current record, while the end of track sector 910 identifies the last sector of the NVS track 248. With embodiments, this is helpful as CKD tracks may be of varying length.

The commands component 260 on the NVS node synchronously calls the NVS manager 250 of the NVS node to perform a commit records operation.

Figure 10A:
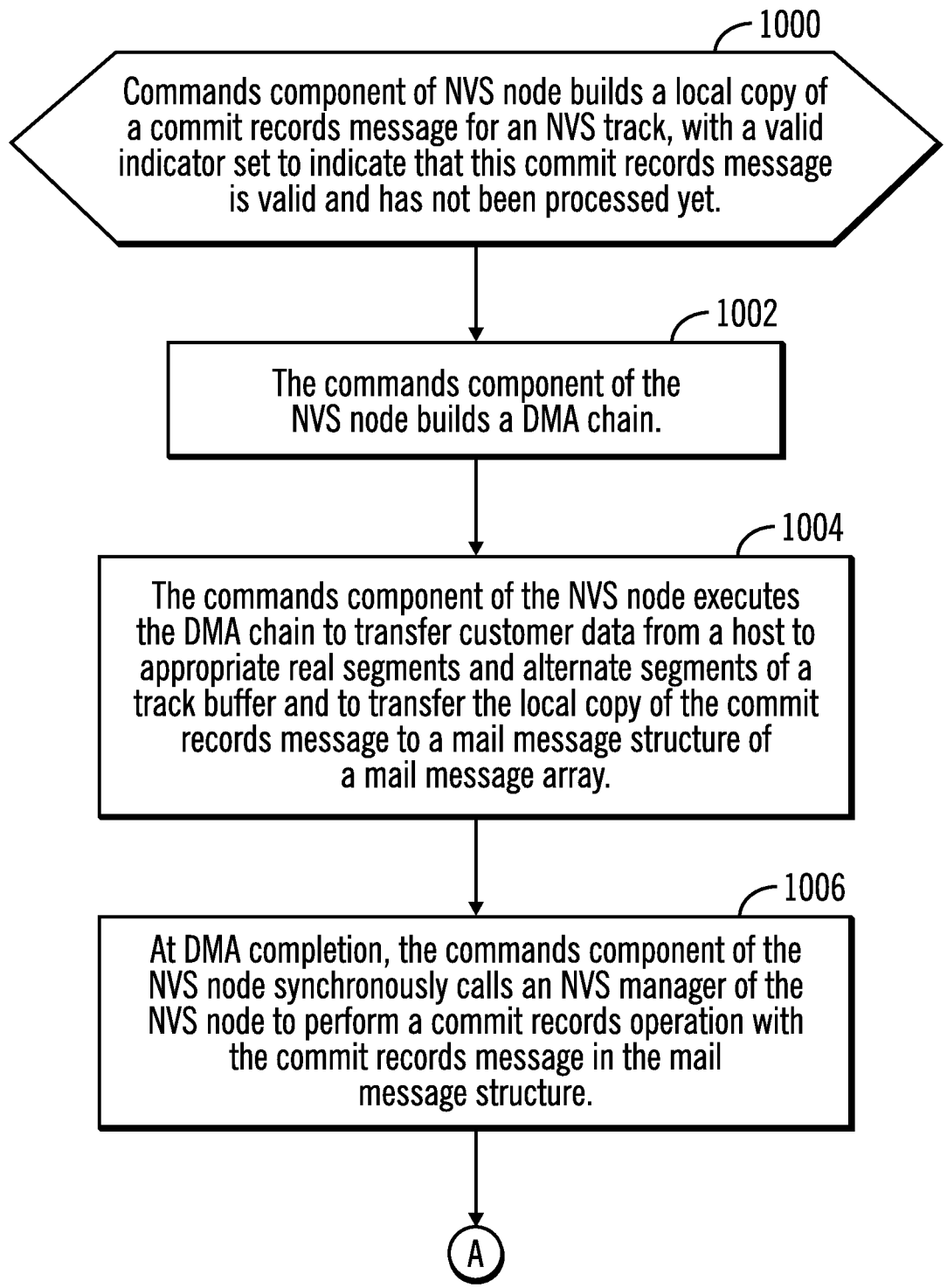
FIGS. 10A and 10B illustrates, in a flowchart, operations for synchronously performing commit records processing in accordance with embodiments.
Figure 10B:
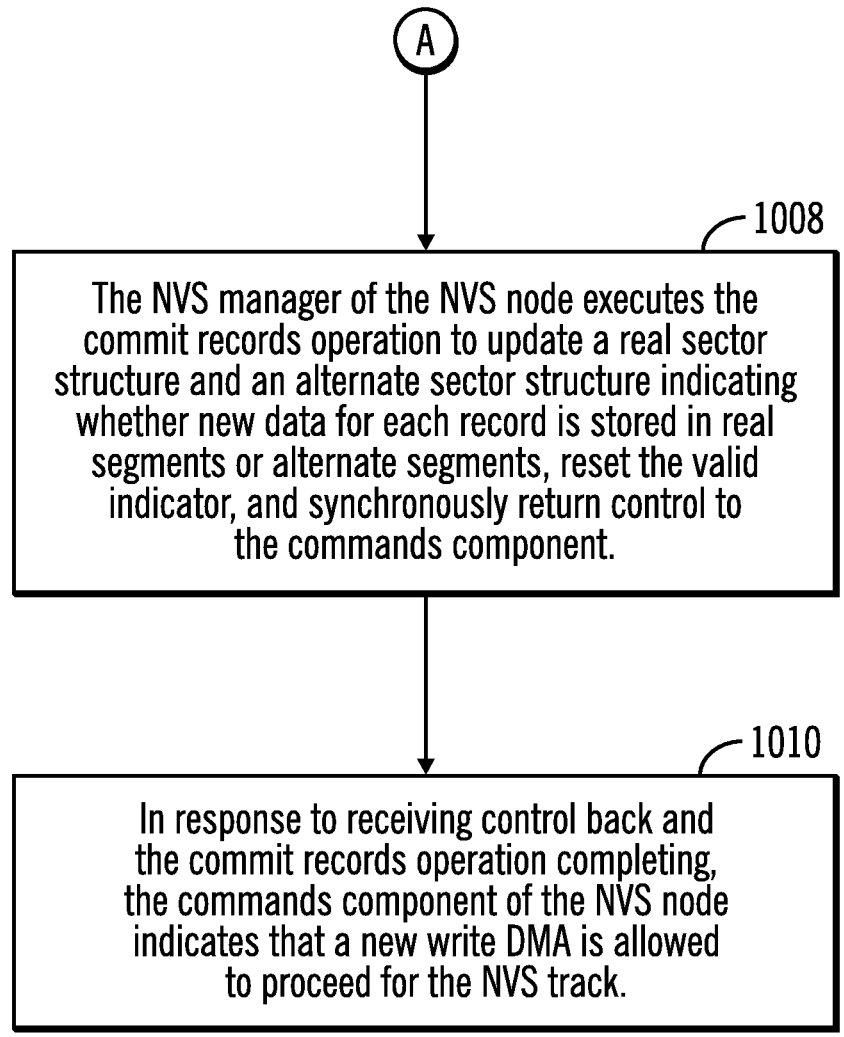

FIGS. 10A and 10B illustrates, in a flowchart, operations for synchronously performing commit records processing in accordance with certain embodiments. Control begins at block 1000 with the commands component 260 of the NVS node building a local copy in memory 210 of a commit records message 9000 for an NVS track 248, with a valid indicator 912 set to indicate that this commit records message is valid and has not been processed yet. In block 1002, the commands component 260 of the NVS node builds a Direct Memory Access (DMA) chain. The DMA chain may be described as hardware commands to perform the data movement of the host data and the commit records message. The use real or alternate segments indicator 914 is useful so that the commands component 260 knows where to DMA the data to, and the NVS manager 250 knows which structure indicators (e.g., bit maps) to set and reset.

In block 1004, the commands component 260 of the NVS node executes the DMA chain to transfer customer data from a host 100 to appropriate real segments 240 and alternate segments 244 of a track buffer 236f . . . 236h and to transfer the local copy of the commit records message 9000 to a mail message structure 264r . . . 264t of a mail message array 262. The track buffer 904 of the commit records message 9000 indicates which of the track buffers 236f . . . 236h is being used.

In block 1006, at DMA completion, the commands component 260 of the NVS node synchronously calls the NVS manager 250 of the NVS node to perform a commit records operation with the commit records message 9000 in the mail message structure 264r . . . 264t. From block 1006 (FIG. 10A), processing continues to block 1008 (FIG. 10B).

In block 1008, the NVS manager 250 of the NVS node executes the commit records operation to 1) update the real sector structure 242 and the alternate sector structure 246 indicating whether new data for each record is stored in real segments 240 or alternate segments 244, 2) reset the valid indicator 912 to indicate that the commit records message 9000 has been processed, and 3) synchronously return control to the commands component 260.

In block 1010, in response to receiving control back and the commit records operation completing, the commands component 260 of the NVS node indicates that a new write DMA is allowed to proceed for the NVS track 248.

Figure 11:
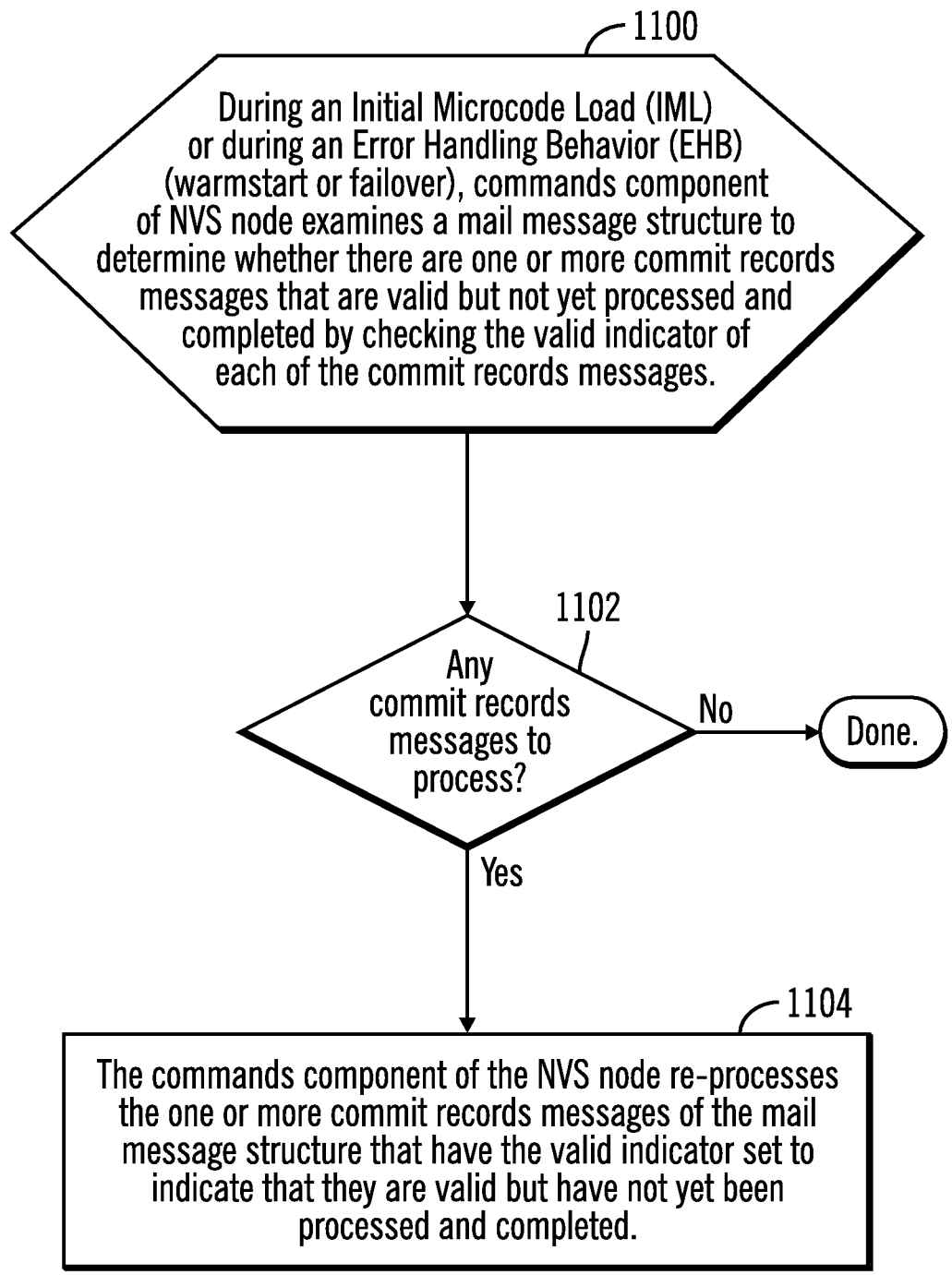
FIG. 11 illustrates, in a flowchart, operations for re-processing a commit records message in accordance with certain embodiments.

FIG. 11 illustrates, in a flowchart, operations for re-processing a commit records message in accordance with certain embodiments. Control begins at block 1100, during an Initial Microcode Load (IML), following a reboot or power loss, or during an Error Handling Behavior (EHB) (warmstart or failover), the commands component 260 examines a mail message structure 264r . . . 264t to determine whether there are one or more commit records messages 9000 that are valid but not yet processed and completed by checking the valid indicator of each of the commit records messages. In block 1102, the commands component 260 of the NVS node determines whether there are any commit records messages 9000 to process. If so, processing continues to block 1104, otherwise, processing is done. In block 1104, the commands component 260 of the NVS node re-processes the one or more commit records messages 9000 of the mail message structure 264r . . . 264t that have the valid indicator set to indicate that they are valid but have not yet been processed and completed.

Thus, with embodiments, when a write DMA completion is processed by the commands component 260 of the NVS node, the commands component 260 processes a commit records message 9000 in a mail message structure 264r . . . 264t of the NVS 234. The mail message structure 264r . . . 264t is preserved across a power loss and Error Handling Behavior (EHB). The commands component 260 synchronously calls the NVS manager 250 to perform the commit records operation.

If power loss or EHB occurs during the commit records operation processing, then any commit records message 9000 in the mail message structure 264r . . . 264t may be re-processed during the subsequent IML or EHB to complete the work for the commit records operation without losing data.

The reference characters used herein, such as g, h, m, n, r, t, x, and y are used to denote a variable number of instances of an element, which may represent the same or different values, and may represent the same or different value when used with different or the same elements in different described instances.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
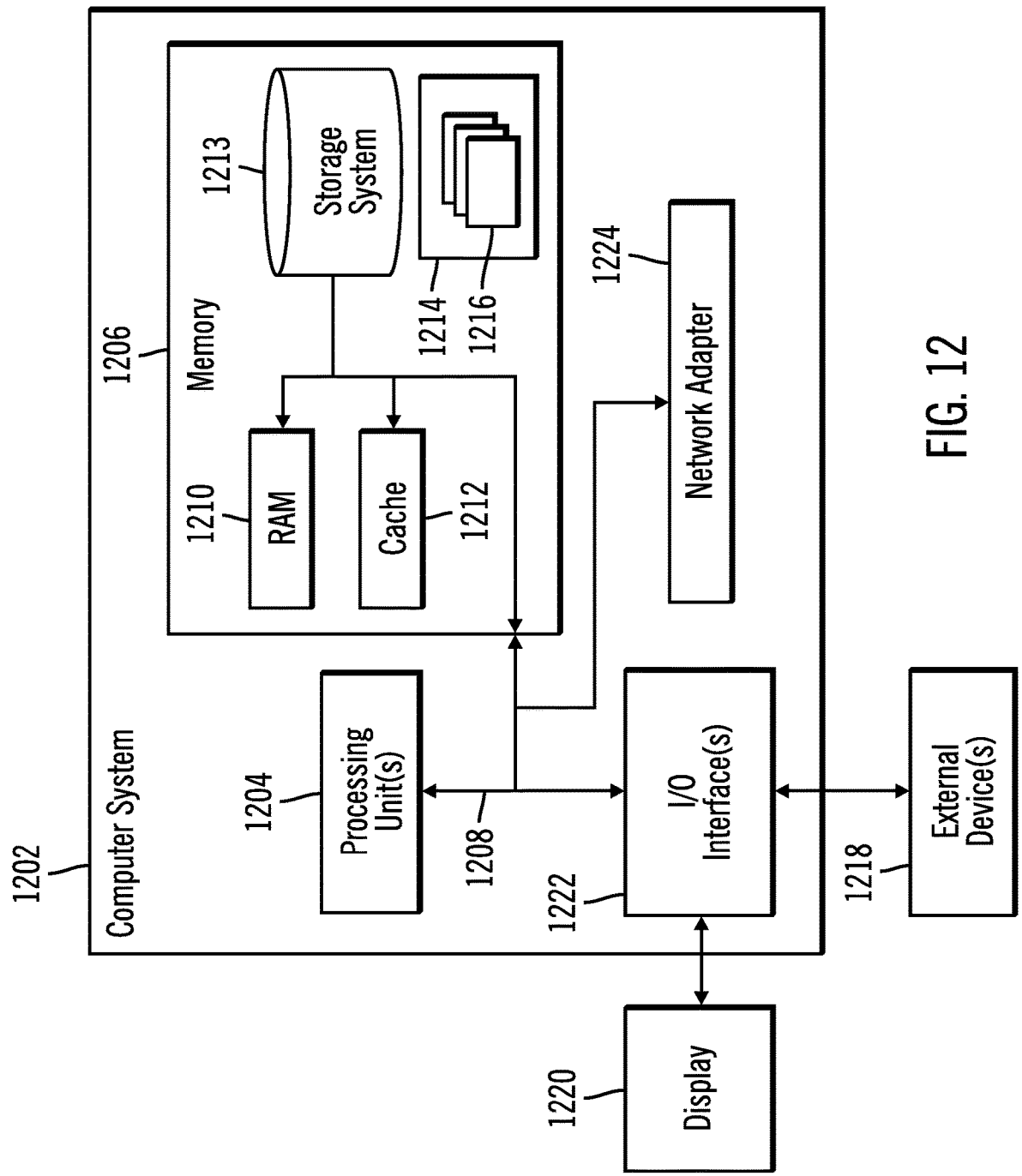
FIG. 12 illustrates an embodiment of a computer architecture used with described embodiments.

The computational components of FIG. 1, including the host 100 and storage system 102 may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having program code embodied therewith, the program code executable by at least one processor to perform:
   providing, in Non-Volatile Storage (NVS), a plurality of track buffers, NVS tracks, and a mail message array, wherein each of the plurality of track buffers stores real segments, a real sector structure, alternate segments, and an alternate sector structure, wherein the real sector structure has an indicator for each sector of each segment in the real segments that indicates whether data for that sector is stored in the real segments, and wherein the alternate sector structure has an indicator for each sector of each segment in the alternate segments that indicates whether data for that sector is stored in the alternate segments; and
   under control of a commands component, building a local copy of a commit records message for an NVS track, wherein the commit records message comprises: a valid indicator set to indicate that this commit records message is valid and has not been processed yet, an indicator of a track buffer of the plurality of track buffers, and a use real or alternate segments indicator that indicates whether the data for each record is to be stored in the real segments or the alternate segments;

executing a Direct Memory Access (DMA) chain to transfer customer data from a host to the real segments and the alternate segments of the track buffer and to transfer the local copy of the commit records message to a mail message structure of the mail message array;

at DMA completion, synchronously calling an NVS manager to execute a commit records operation with the commit records message in the mail message structure, wherein the NVS manager updates the real sector structure and the alternate sector structure to indicate whether new data for each record is stored in the real segments or in the alternate segments, resets the valid indicator to indicate that the commit records message has been processed, and synchronously returns control to the commands component; and in response to the commit records operation completing and receiving control, indicating that a new write DMA is allowed to proceed for the NVS track.

2. The computer program product of claim 1, wherein the commit records message further comprises: a track identifier, a start sector, an end sector, and an end of track sector.

3. The computer program product of claim 1, wherein the program code is executable by the at least one processor to perform:

building the DMA chain.

4. The computer program product of claim 1, wherein the program code is executable by the at least one processor to perform:

during any of an Initial Microcode Load (IML) and an Error Handling Behavior (EHB), examining the mail message structure to determine whether the commit records message has the valid indicator set to indicate that the mail message structure is to be processed; and in response to determining that the valid indicator is set to indicate that the mail message structure is to be processed, re-processing the commit records message.

5. The computer program product of claim 1, wherein the mail message structure is preserved across a power loss and Error Handling Behavior (EHB) in Non-Volatile Storage.

6. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising:

providing, in Non-Volatile Storage (NVS), a plurality of track buffers, NVS tracks, and a mail message array, wherein each of the plurality of track buffers stores real segments, a real sector structure, alternate segments, and an alternate sector structure, wherein the real sector structure has an indicator for each sector of each segment in the real segments that indicates whether data for that sector is stored in the real segments, and wherein the alternate sector structure has an indicator for each sector of each segment in the alternate segments that indicates whether data for that sector is stored in the alternate segments; and under control of a commands component, building a local copy of a commit records message for a an NVS track, wherein the commit records message comprises: a valid indicator set to indicate that this commit records message is valid and has not been processed yet, an indicator of a track buffer of the plurality of track buffers, and a use real or alternate segments indicator that indicates whether the data for each record is to be stored in the real segments or the alternate segments;

executing a Direct Memory Access (DMA) chain to transfer customer data from a host to the real segments and the alternate segments of the track buffer and to transfer the local copy of the commit records message to a mail message structure of the mail message array;

at DMA completion, synchronously calling an NVS manager to execute a commit records operation with the commit records message in the mail message structure, wherein the NVS manager updates the real sector structure and the alternate sector structure to indicate whether new data for each record is stored in the real segments or in the alternate segments, resets the valid indicator to indicate that the commit records message has been processed, and synchronously returns control to the commands component; and in response to the commit records operation completing and receiving control, indicating that a new write DMA is allowed to proceed for the NVS track.

7. The computer system of claim 6, wherein the commit records message further comprises: a track identifier, a start sector, an end sector, and an end of track sector.

8. The computer system of claim 6, wherein the operations further comprise:

building the DMA chain.

9. The computer system of claim 6, wherein the operations further comprise:

during any of an Initial Microcode Load (IML) and an Error Handling Behavior (EHB), examining the mail message structure to determine whether the commit records message has the valid indicator set to indicate that the mail message structure is to be processed; and in response to determining that the valid indicator is set to indicate that the mail message structure is to be processed, re-processing the commit records message.

10. The computer system of claim 6, wherein the mail message structure is preserved across a power loss and Error Handling Behavior (EHB) in Non-Volatile Storage.

11. A computer-implemented method, comprising:

providing, in Non-Volatile Storage (NVS), a plurality of track buffers, NVS tracks, and a mail message array, wherein each of the plurality of track buffers stores real segments, a real sector structure, alternate segments, and an alternate sector structure, wherein the real sector structure has an indicator for each sector of each segment in the real segments that indicates whether data for that sector is stored in the real segments, and wherein the alternate sector structure has an indicator for each sector of each segment in the alternate segments that indicates whether data for that sector is stored in the alternate segments; and under control of a commands component, building a local copy of a commit records message for a an NVS track, wherein the commit records message comprises: a valid indicator set to indicate that this commit records message is valid and has not been processed yet, an indicator of a track buffer of the plurality of track buffers, and a use real or alternate segments indicator that indicates whether the data for each record is to be stored in the real segments or the alternate segments;

executing a Direct Memory Access (DMA) chain to transfer customer data from a host to the real segments and the alternate segments of the track buffer and to transfer the local copy of the commit records message to a mail message structure of the mail message array;

at DMA completion, synchronously calling an NVS manager to execute a commit records operation with the commit records message in the mail message structure, wherein the NVS manager updates the real sector structure and the alternate sector structure to indicate whether new data for each record is stored in the real segments or in the alternate segments, resets the valid indicator to indicate that the commit records message has been processed, and synchronously returns control to the commands component; and in response to the commit records operation completing and receiving control, indicating that a new write DMA is allowed to proceed for the NVS track.

12. The computer-implemented method of claim 11, wherein the commit records message further comprises: a track identifier, a start sector, an end sector, and an end of track sector.

13. The computer-implemented method of claim 11, further comprising:

building the DMA chain.

14. The computer-implemented method of claim 11, further comprising:

during any of an Initial Microcode Load (IML) and an Error Handling Behavior (EHB), examining the mail message structure to determine whether the commit records message has the valid indicator set to indicate that the mail message structure is to be processed; and in response to determining that the valid indicator is set to indicate that the mail message structure is to be processed, re-processing the commit records message.

15. The computer-implemented method of claim 11, wherein the mail message structure is preserved across a power loss and Error Handling Behavior (EHB) in Non-Volatile Storage.

* * * * *